US007778027B2

United States Patent
Kitamura et al.

(10) Patent No.: US 7,778,027 B2
(45) Date of Patent: Aug. 17, 2010

(54) ELECTRONIC DEVICE

(75) Inventors: Tomoko Kitamura, Ome (JP); Yuichi Hirai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/478,650

(22) Filed: Jun. 4, 2009

(65) Prior Publication Data
US 2010/0149744 A1  Jun. 17, 2010

(30) Foreign Application Priority Data
Dec. 16, 2008  (JP)  ............... 2008-320107

(51) Int. Cl.
 H05K 5/00  (2006.01)
(52) U.S. Cl. ............... 361/679.57; 361/679.27; 361/679.55
(58) Field of Classification Search ......... 361/679.27, 361/679.55, 679.57
See application file for complete search history.

(56) References Cited

U.S. PATENT DOCUMENTS

| 5,987,937 | A | * | 11/1999 | Lee ............... 70/14 |
| 7,489,507 | B2 | | 2/2009 | Karashima et al. |
| 2005/0117286 | A1 | | 6/2005 | Karashima et al. |
| 2007/0146988 | A1 | | 6/2007 | Yamagishi et al. |
| 2007/0245778 | A1 | * | 10/2007 | Lu ............... 70/58 |
| 2008/0037205 | A1 | | 2/2008 | Arisaka et al. |
| 2009/0040694 | A1 | | 2/2009 | Karashima et al. |
| 2009/0040707 | A1 | | 2/2009 | Karashima et al. |

FOREIGN PATENT DOCUMENTS

| JP | 10-268971 | 10/1998 |
| JP | 2000-137542 | 5/2000 |
| JP | 2001-084059 | 3/2001 |
| JP | 2002-149264 | 5/2002 |
| JP | 2005-128805 | 5/2005 |
| JP | 2005-165710 | 6/2005 |
| JP | 2007-172328 | 7/2007 |
| JP | 2008-040990 | 2/2008 |
| JP | 2008-065437 | 3/2008 |
| WO | WO 2008/114371 | 9/2008 |

OTHER PUBLICATIONS

Japanese Patent Application No. 2009-267395, Notice of Reasons for Rejection, mailed Jan. 19, 2010. (English translation).
Japanese Patent Application No. 2009-267395, Notice of Reasons for Rejection, mailed Apr. 20, 2010.

* cited by examiner

*Primary Examiner*—Jayprakash N Gandhi
*Assistant Examiner*—Anthony M Haughton
(74) *Attorney, Agent, or Firm*—Blakely, Sokoloff, Taylor & Zafman LLP

(57) ABSTRACT

According to one embodiment, an electronic device includes a main body unit, a display unit rotatable between a first position where the display unit covers the main body unit and a second position where the display unit stands up with respect to the main body unit, and a securing portion provided at a position astride the display unit and the main body unit, to which an anti-theft wire is secured.

3 Claims, 8 Drawing Sheets

ELECTRONIC DEVICE

CROSS-REFERENCE TO RELATED APPLICATIONS

This application is based upon and claims the benefit of priority from Japanese Patent Application No. 2008-320107, filed Dec. 16, 2008, the entire contents of which are incorporated herein by reference.

BACKGROUND

1. Field

One embodiment of the present invention relates to an electronic device equipped with a securing member to which an anti-theft wire is secured.

2. Description of the Related Art

Japanese Patent Application KOKAI Publication No. 2008-65437 discloses an anti-theft device which locks the security slot of a device via a T-shaped shaft. This anti-theft device is also known as Kensington lock, and is used to secure a notebook personal computer comprising a main body unit and a display unit. The anti-theft device includes a locking wire containing a T-shaped shaft, a security slot provided on a housing of the main body unit and to which the T-shaped shaft is hooked, a recording medium detachably attached in an opening portion of the housing, a shutter provided for the opening portion and a locking bar which engages with the shutter. The shutter is provided to be pivotable on the housing so as to open the opening portion to the outside or tightly closing the opening portion. The security slot is provided at a central portion of a side surface of the main body unit.

In this anti-theft device, when the locking wire is secured to the security slot, the T-shaped shaft is rotated. As the T-shaped shaft is rotated, the locking bar is engaged with the shutter or disengaged therefrom. In this manner, it is possible to prevent not only the main body of the device bet also the recording medium from being stolen.

In recent years, in the field of mobile information terminals and notebook personal computers, there is an increasing demand of thinning and reducing in size of the devices. Here, if the security slot is provided at the center portion of the side surface of the main body unit as in the above-described conventional anti-theft device, the main body unit cannot be thinned further from a certain thickness in the improvement process of thinning the main body unit due to the fact that the height of the security slot limits the improvement. Under these circumstances, the above-described conventional anti-theft device is no longer able to meet the recent demand of thinning and reducing the size of the electronic device, but it is still susceptible to improvements.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic device includes a main body unit, a display unit rotatable between a first position where the display unit covers the main body unit and a second position where the display unit stands up with respect to the main body unit, and a securing portion provided at a position astride the display unit and the main body unit, to which an anti-theft wire is secured.

Embodiments of the electronic device according to the present invention will now be described with reference to FIGS. 1 to 7.

Figure 6:
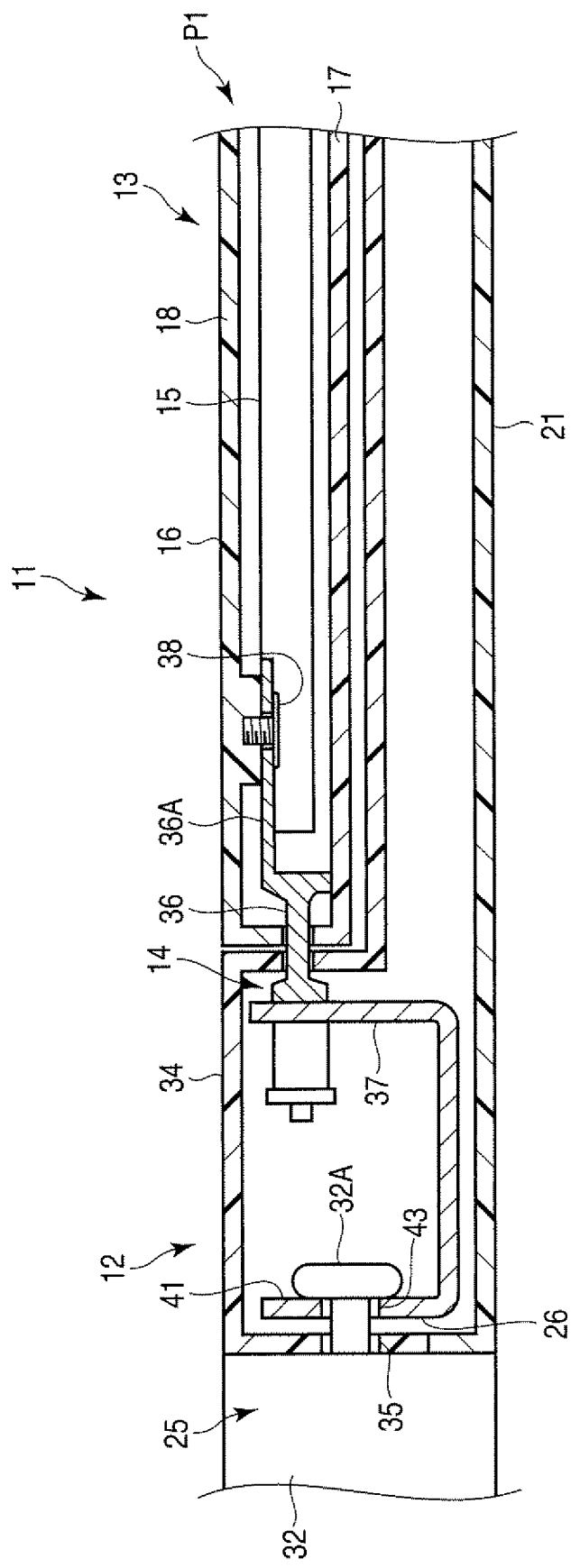
FIG. 6 is an exemplary cross sectional view taken along the line F6-F6 in FIG. 2.

As shown in FIGS. 1 to 3 and 7, a portable computer 11, which is an example of the electronic device, includes a main body unit 12, a display unit 13 and a hinge mechanism 14 which connects the main body unit 12 and the display unit 13 to each other. As shown in FIG. 6, the hinge mechanism 14 is provided at a position between the main body unit 12 and the display unit 13 such as to extend across both of the main body unit 12 and the display unit 13. In the following explanation, F shown in FIG. 1 indicates a front direction and R indicates as rear direction.

Figure 1:
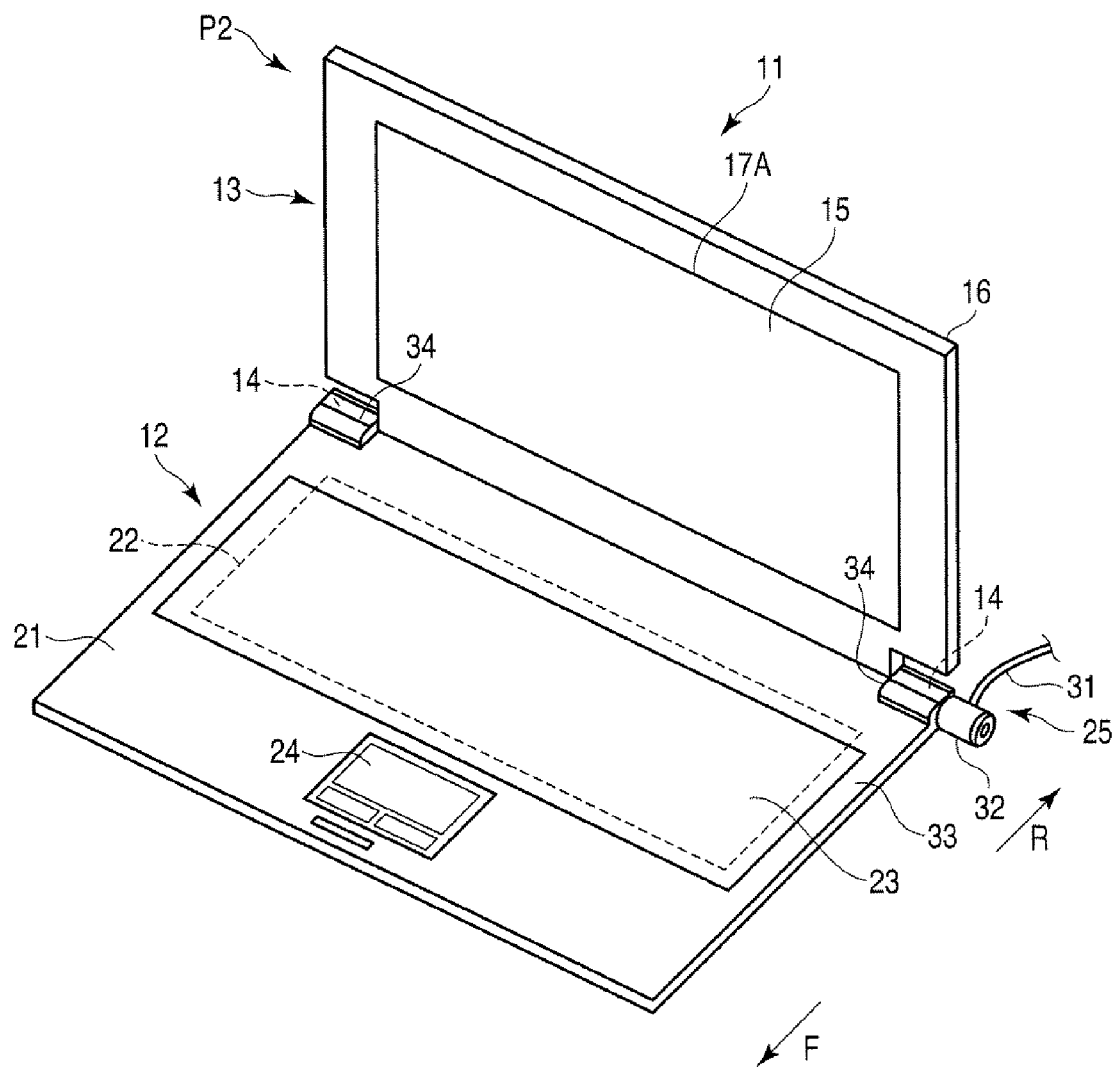
FIG. 1 is an exemplary perspective view showing a portable computer according to the first embodiment.
Figure 2:
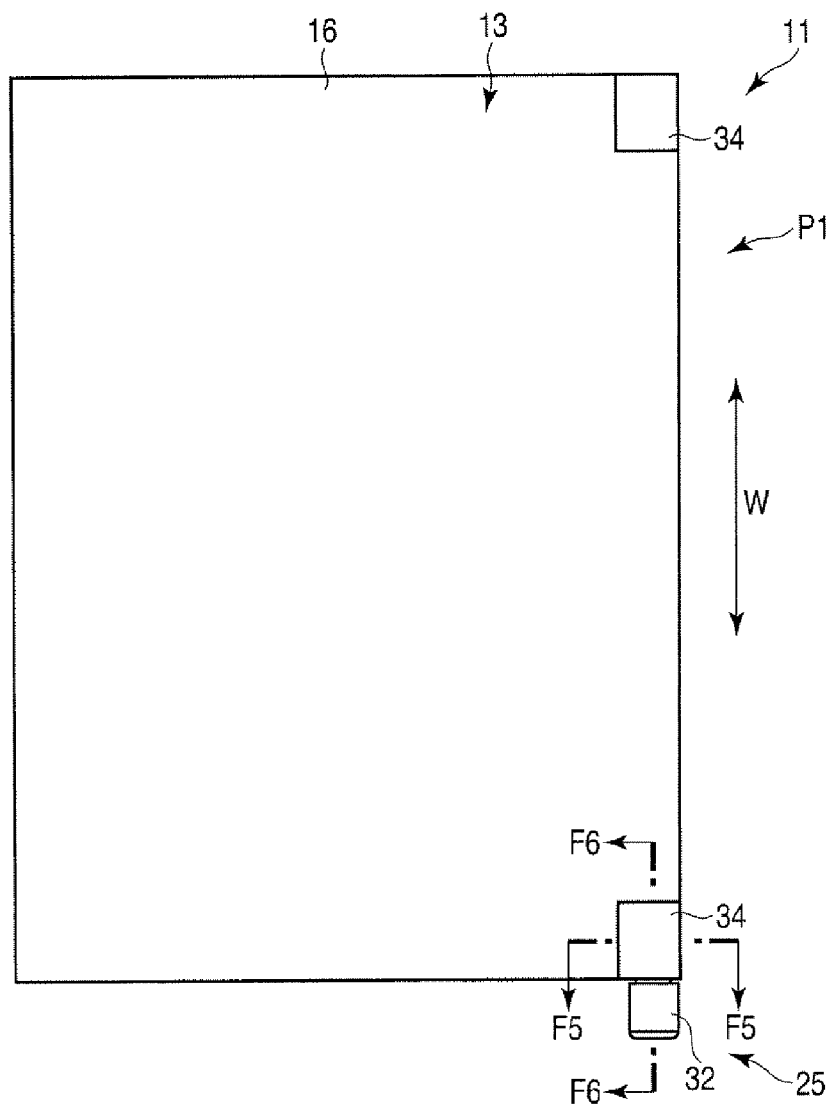
FIG. 2 is an exemplary top view of the portable computer shown in FIG. 1, when the display unit is located at the first position.
Figure 3:
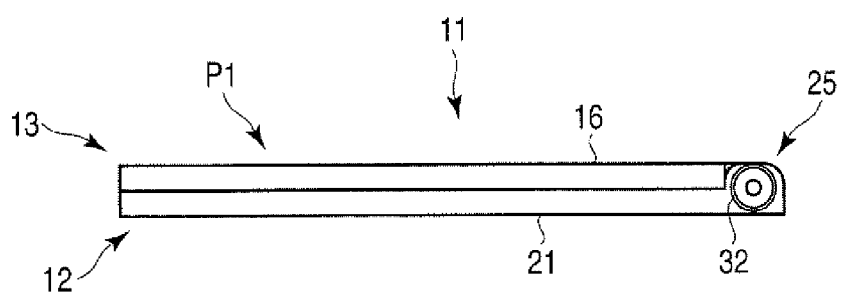
FIG. 3 is an exemplary side view of the portable computer shown in FIG. 1, when the display unit is located at the first position.

As shown in FIG. 1, the display unit 13 includes a liquid crystal display 15, which is an example of the display, and a display cabinet 16 which surrounds the liquid crystal display 15. The display cabinet 16 is formed of, for example, a synthetic resin, and serves as an outer shell of the display unit 13. As shown in FIGS. 1 and 6, the display cabinet 16 includes a mask 17 which includes an opening portion 17A in a central portion and covers the front surface of the liquid crystal display, and a cover 18 which covers the rear surface of the liquid crystal display. The display unit 13 can be rotated by means of the hinge mechanism 14 between a first position P1 where the display unit covers the main body unit 12 as shown in FIG. 3 and a second position P2 where the display unit stands up to open with respect to the main body unit 12 as shown in FIG. 1.

As shown in FIGS. 1 to 5, the main body unit 12 includes a main body cabinet 21 serving as an outer shell, a printed circuit board 22 housed inside the main body cabinet 21, a keyboard 23 and a touch pad 24 placed on an outer side of the main body cabinet 21, an anti-theft wire 25 (Kensington lock)

attached to the main body cabinet 21, and a metal fitting 26 housed inside the main body cabinet 21. In this embodiment, the keys on the keyboard 23 are not illustrated in the figures. The main body cabinet 21 is formed of, for example, a synthetic resin, and it comprises two upper and lower separate portions joined together. The printed circuit board 22 is the so-called main board, on which a plurality of circuit parts including, for example, CPU are mounted. As shown in FIGS. 1 and 6, the anti-theft wire 25 includes a wire main body 31 and a lock portion 32 provided at a distal end of the wire main body 31. The lock portion 32 further includes a nail portion 32A which has a T shape.

Figure 4:
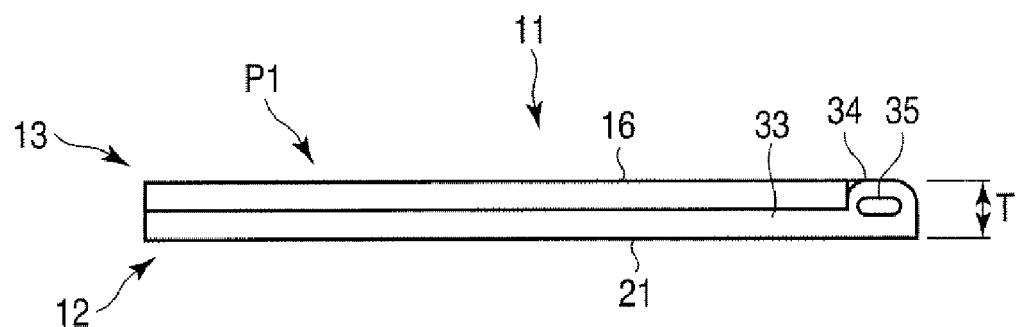
FIG. 4 is an exemplary side view of the portable computer shown in FIG. 3, when the anti-theft wire is detached.
Figure 5:
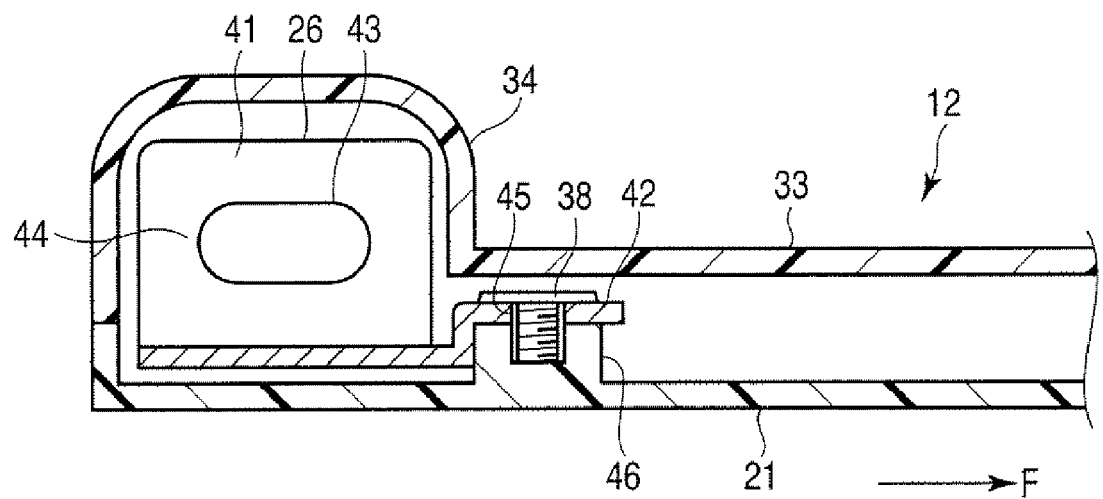
FIG. 5 is an exemplary cross sectional view taken along the line F5-F5 in FIG. 2.

As shown in FIGS. 4 and 5, the main body cabinet 21 includes a main portion 33 to which the keyboard 23, etc. are secured, a projection portion 34 projecting from the main portion 33 towards the display unit 13 and a securing portion 35 to which the lock portion 32 of the anti-theft wire 25 is secured. The securing portion 35 is provided on a side surface of the projecting portion 34 and in the vicinity of the hinge mechanism 14. The securing portion 35 is provided at a position astride both of the display unit 13 set at the first position P1 and the main body unit 12 in the thickness direction. The securing portion 35 is a through hole which is the so-called security slot. The securing portion 35 has a slit shape elongated in the extending direction of the main body unit 12, and both of the end portions of the slit is rounded to have the so-called elliptic shape. It should be noted that the housing is a technical concept which includes the above-described display cabinet 16 and the main body cabinet 21.

In this embodiment, the projecting portion 34 is provided at a part of the main body unit 12 such as to project from the main body unit 12 towards the display unit 13. As shown in FIG. 4, the projecting portion 34 is the section where the portable computer 11 has its maximum thickness dimension T. Here, the maximum thickness dimension T is that of the section where the thickness of the portable computer 11 becomes the maximum when the display unit 13 is set at the first position P1. The maximum thickness dimension T is the same as that of the lock portion 32 of the anti-theft wire 25 or smaller, and thus the minimization of the thickness dimension of the portable computer 11 is realized.

The hinge mechanism 14 is provided at the most deep section of the portable computer 11. As shown in FIG. 6, the hinge mechanism 14 includes, for example, a rotation shaft 36 provided astride the main body unit 12 and the display unit 13, and a bearing portion 37 housed inside the main body cabinet 21 and supporting the rotation shaft 36 to be rotatable. The bearing portion 37 has a round hole (not shown) through which the rotation shaft 36 is put, and it can support the rotation shaft 36 via the round hole. The rotation shaft 36 includes a support portion 36A at an end portion located on an inner side of the display cabinet 16, and it is secured to the display cabinet 16 with a screw 38 put through the support portion 36A.

The metal fitting 26 is provided at the most deep section of the main body cabinet 21. The metal fitting 26 is provided in the vicinity of the securing portion 35 of the main body cabinet 21, and it is located there to reinforce the securing portion 35 of the main body cabinet 21 from an inner side. As shown in FIG. 6, the metal fitting 26 is integrated with the bearing portion 37 of the hinge mechanism 14. The metal fitting 26 forms, together with the bearing portion 37, has a U shape in cross section. As shown in FIGS. 5 and 6, the metal fitting 26 includes a hook portion 41 to which the nail portion 32A of the anti-theft wire 25 is hooked, and a mount portion 42 to be mounted to the main body cabinet 21. The hook portion 41 includes an opening portion 43 in its central portion, having such a shape of a slit with both ends rounded, that is, an elliptic shape, and an edge portion 44 which defines the edge of the opening portion 43. The mount portion 42 has a hole portion through which a screw 38 is put, and the mount portion 42 is secured to a boss 46 of the main body cabinet 21 with the screw 38.

As shown in FIG. 5, the mount portion 42 is located at, for example, a position deviated from the section where the hook portion 41 is located, in the front direction F of the portable computer 11 so that the mount portion 42 and the hook portion 41 are not arranged to overlap with each other. The mount portion 42 serves also as a securing portion 35 which can secure the hinge mechanism 14 to the main body cabinet 21. Here, since the mount portion 42 is located at a position deviated from that of the hook portion 41, it is located within the range of the height of the hook portion 41. With this structure, the dimension required to install the metal fitting 26 in the thickness direction is decreased, and thus the thickness of the main body unit 12 can be decreased. Note that it suffices only if the location of the mount portion 42 is deviated from that of the hook portion 41. For example, the mount portion 42 may be deviated from the hook portion 41 in the width direction W of the portable computer 11.

According to the first embodiment, the portable computer 11 includes the main body unit 12, the display unit 13 rotatable between the first position P1 where it covers the main body unit 12 and the second position P2 where it stands up with respect to the main body unit 12, and the securing portion 35 provided at a position astride the display unit 13 and the main body unit 12, to which the anti-theft wire 25 is secured.

In general, a securing portion which secures an anti-theft wire serves as a factor which increases the thickness dimension of the portable computer since there is a necessity of forming a through hole at that position or providing a reinforcing part inside the computer. With the above-described structure, the securing portion 35 is situated to be astride both sides of the display unit 13 and the main body unit 12. Therefore, the portable computer 11 can be formed thinner as compared to the case where the securing portion 35 is provided within the thickness dimension of either one of the display unit 13 and the main body unit 12.

Further, the securing portion 35 is located at the section which has the maximum thickness dimension T. With this structure, the securing portion 35 can be formed in the section which originally has the maximum thickness dimension T. Therefore, such an adverse effect that the thickness measurement may be increased due to the securing portion 35 provided therein can be suppressed as much as possible.

The portable computer 11 includes the housing which serves as an outer shell of the main body unit 12 and the display unit 13, and the metal fitting 26 including the hook portion 41 to which the anti-theft wire 25 is hooked and the mount portion 42 to be mounted to the housing, and provided inside the housing so as to reinforce the securing portion 35. Here, the mount portion 42 is located within the range of the height of the hook portion 41. With this structure, the mount portion 42 is located to overlap with the position where the hook portion 41 is provided in the thickness direction. Therefore, it is possible to avoid the thickness dimension of the portable computer 11 from further increasing in the section where the mount portion 42 is provided. In this manner, the thinning of the portable computer 11 can be further promoted.

The portable computer 11 according to this embodiment includes the hinge mechanism 14 provided at a position between the main body unit 12 and the display unit 13 such as to make the display unit 13 rotatable between the first position P1 and the second position P2. The securing portion 35 is provided in the vicinity of the hinge mechanism 14. With this structure, the securing portion 35 is located around the hinge mechanism 14, which generally and easily takes the maximum thickness measurement. In other words, the vicinity of the hinge mechanism 14 needs to have a certain degree or more of thickness in order to build the hinge mechanism 14 therein. Since the securing portion is provided in this section, such an adverse effect that the thickness measurement may be increased due to the securing portion 35 provided therein can be suppressed as much as possible. In this manner, the thinning of the portable computer 11 can be further promoted.

In this embodiment, the metal fitting 26 is integrated with the hinge mechanism 14. With this structure, the space required to install these members can be reduced as compared to the case where the metal fitting 26 and the hinge mechanism 14 are provided as separate bodies. In this manner, the portable computer 11 can be further reduced in size and thinned. Further, the mount portion 42 which secures the metal fitting 26 to the housing is rendered to also serve as a securing portion which secures the hinge mechanism 14 to the housing. In this manner as well, the space required to install a screw and the like can be omitted. Thus, the downsizing and thinning of the portable computer 11 can be further promoted. Furthermore, when integrated with the hinge mechanism 14, it is possible to prevent the metal fitting 26 from becoming loose.

The securing portion 35 is a through hole made in the housing such as to be elongated in the direction parallel to the direction in which the main body unit 12 is extended. With this structure, the through hole is elongated in parallel with the direction of the main body unit 12. Therefore, when making the through hole, only the minimum possible space in the thickness direction is required. In this manner, the forming of the through hole does not hinder the promotion of the thinning of the portable computer 11.

The housing includes the projecting portion 34 projecting from the main body unit 12 towards the display unit 13, and the securing portion 35 is provided on the projecting portion 34. With this structure, the securing portion 35 can be formed in the main body unit 12. Further, a predetermined thickness dimension can be maintained in advance in the projecting portion 34. Therefore, with the structure that the securing portion 35 is provided at this position, it is possible to prevent the portable computer 11 from becoming thicker as a result of providing the securing portion 35.

Next, with reference to FIGS. 7 to 11, the second embodiment of the electronic device will now be described. A portable computer 51, which is an example of the electronic device of the second embodiment, is different from that of the first embodiment only in the respects that a projecting portion 34 is formed on a display cabinet 16, a metal fitting 26 is housed in a display cabinet 16 and a mount portion 42 of the metal fitting 26 is provided at a different position, and the other parts are common. Therefore, the following descriptions are made in connection with the part different from that of the first embodiment. Parts common to both embodiments are designated by the same reference numerals, and the descriptions for these parts will be omitted.

Figure 7:
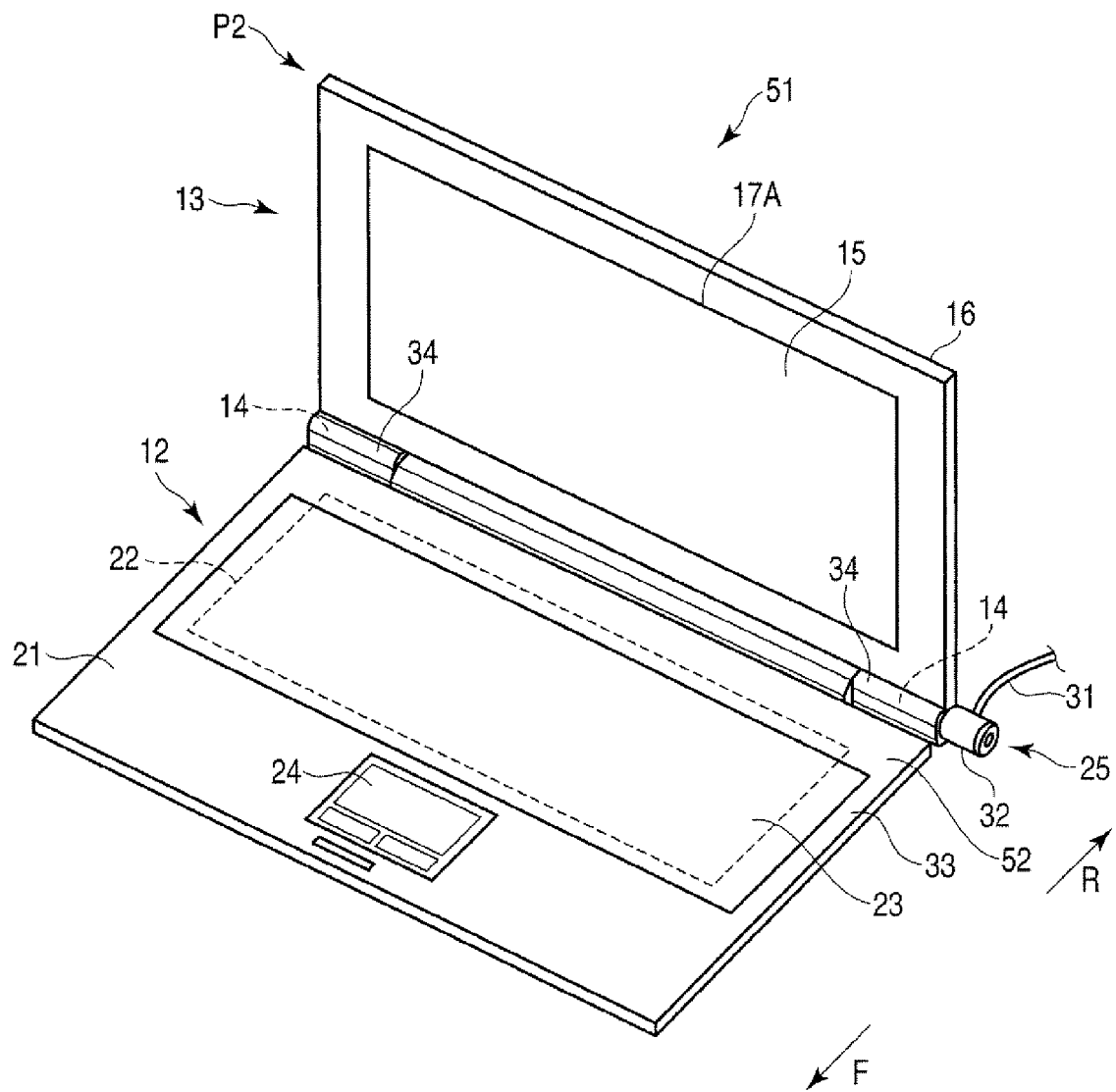
FIG. 7 is an exemplary perspective view showing a portable computer according to the second embodiment.
Figure 8:
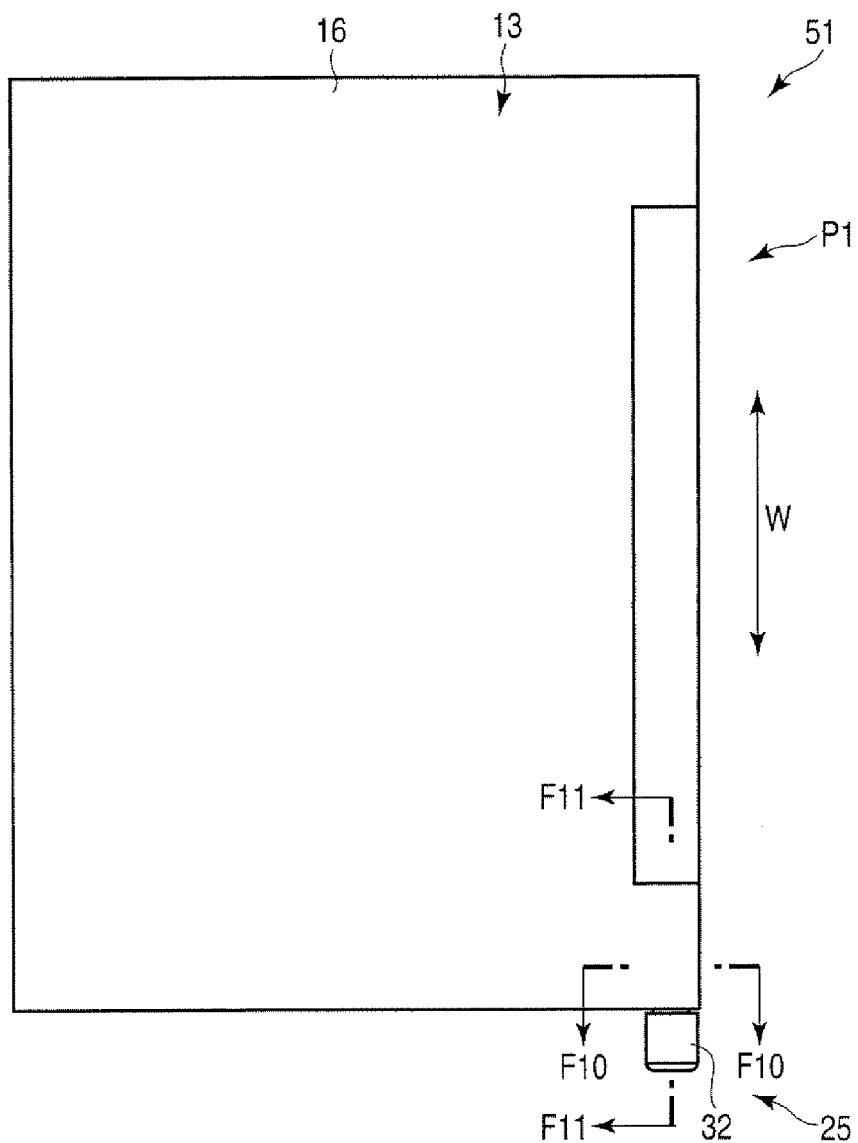
FIG. 8 is an exemplary top view of the portable computer shown in FIG. 7, when the display unit is located at the first position.
Figure 9:
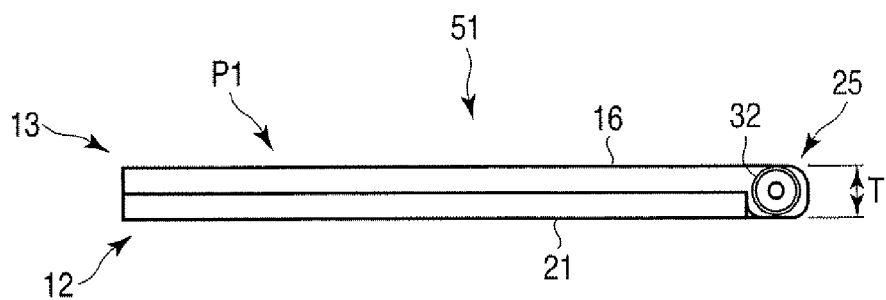
FIG. 9 an exemplary a side view of the portable computer shown in FIG. 7, when the display unit is located at the first position.
Figure 10:
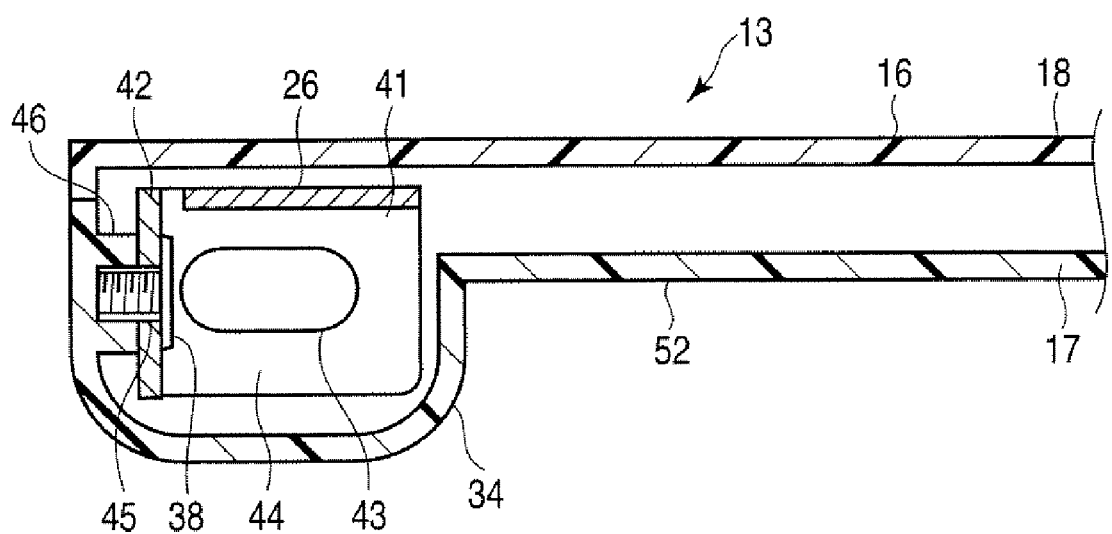
FIG. 10 is an exemplary cross sectional view taken along the line F10-F10 in FIG. 8.

As shown in FIGS. 7 to 9, a main body unit 12 includes a main body cabinet 21 serving as an outer shell, and a printed circuit board 22 housed inside the main body cabinet 21. The main body cabinet 21 is formed of, for example, a synthetic resin, and it comprises two upper and lower separate portions joined together.

Figure 11:
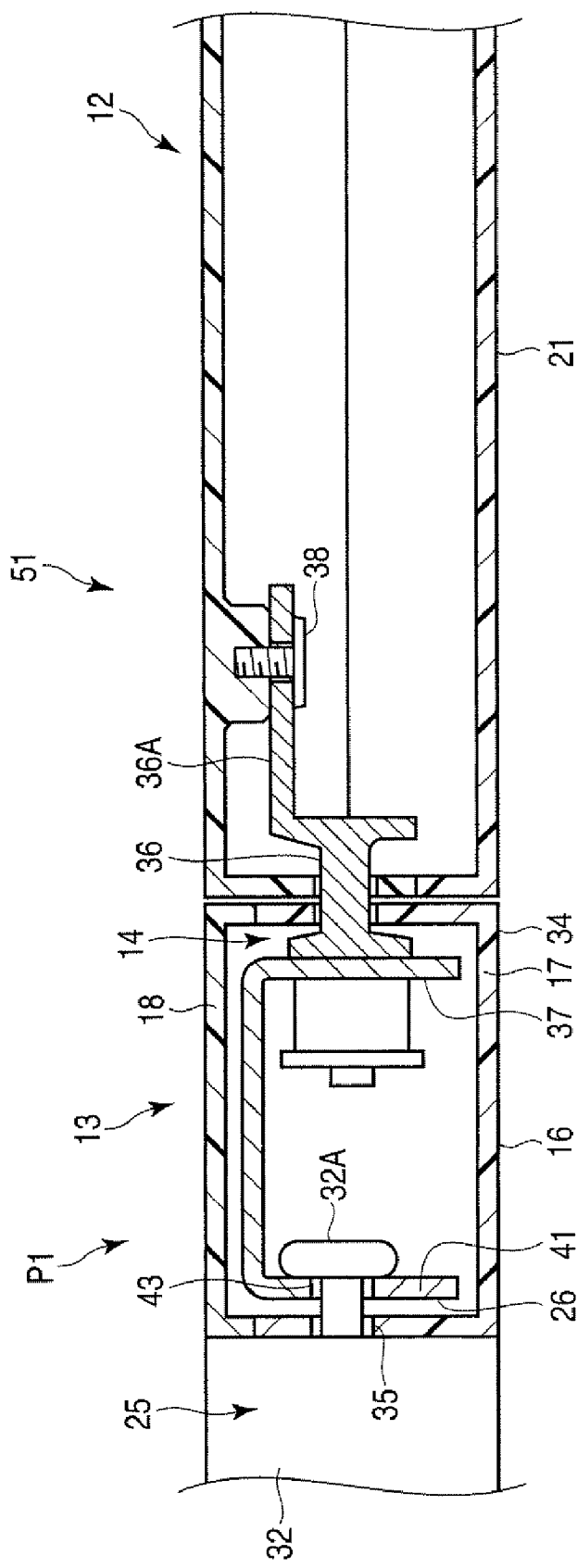
FIG. 11 is an exemplary cross sectional view taken along the line F11-F11 in FIG. 8.

As shown in FIG. 7, the display unit 13 includes a liquid crystal display 15, which is an example of the display, a display cabinet 16 which surrounds the liquid crystal display 15, an anti-theft wire 25 mounted to the display cabinet 16, and a metal fitting 26 housed inside the display cabinet 16. The display cabinet 16 is formed of, for example, a synthetic resin, and serves as an outer shell of the display unit 13. As shown in FIGS. 7 and 11, the display cabinet 16 includes a mask 17 and a cover 18.

As shown in FIG. 9, the display cabinet 16 includes a main portion 52 in which the liquid crystal display is housed, a projection portion 34 projecting from the main portion 52 towards the main body unit 12 and a securing portion 35 provided in a side surface of the projecting portion 34. The projecting portion 34 is provided at a position astride both of the display unit 13 set at the first position 21 and the main body unit 12 in the thickness direction. The securing portion 35 is a through hole. As in the case of the first embodiment, the through hole securing portion 35 has an elliptic shape elongated in the extending direction of the main body unit 12.

In this embodiment, the projecting portion 34 is provided in a part of the display unit 13 such as to project from the display unit 13 towards the main body unit 12. The projecting portion 34 takes the maximum thickness dimension T of the portable computer 51. The maximum thickness dimension of the portable computer 51 is set to be equal to or less than that of the lock portion 32 of the anti-theft wire 25. In this manner, the thickness of the portable computer 51 is minimized.

As shown in FIG. 11, the hinge mechanism 14 includes, for example, a rotation shaft 36 provided to be astride the main body unit 12 and the display unit 13, and a bearing portion 37 housed inside the display cabinet 16 and supporting the rotation shaft 36 to be rotatable. The bearing portion 37 has a round hole (not shown) through which the rotation shaft 36 is put, and it can support the rotation shaft 36 via the round hole. The rotation shaft 36 includes a support portion 36A at an end portion located on an inner side of the main body unit 12, and it is secured to the main body cabinet 21 with a screw 38 put through the support portion 36A.

The metal fitting 26 is provided at the most deep section of the display cabinet 16. The metal fitting 26 is provided in the vicinity of the securing portion 35 of the display cabinet 16, and it is located there to reinforce the securing portion 35 of the display cabinet 16 from an inner side. For example, the metal fitting 26 is integrated with the bearing portion 37 of the hinge mechanism 14. The metal fitting 26 forms, together with the bearing portion 37, has an inversed U shape in cross section. The metal fitting 26 includes a hook portion 41 to which a nail portion 32A of the anti-theft wire 25 is hooked, and a mount portion 42 to be mounted to the main body cabinet 21. The hook portion 41 includes an opening portion 43 having an elliptic shape and an edge portion 44 which defines the edge of the opening portion 43. The mount portion 42 has a hole portion 45 through which a screw 38 is put, and the mount portion 42 is secured to the display cabinet 16 with the screw 38. The mount portion 42 serves as a securing portion which secures the hinge mechanism 14 to the display cabinet 16. The mount portion 42 is provided within the range of the height of the hook portion 41.

The mount portion 42 is provided at a position opposite to a side wall of the projecting portion 34 of the display cabinet 16. A boss 46 which secures the screw 38 is provided on the side wall of the projecting portion 34. The mount portion 42 is secured to the display cabinet 16 via the boss 46. With this structure, the thickness dimension of the main body unit 12 is reduced.

According to the second embodiment, the portable computer 51 can be thinned as in the case of the first embodiment.

Further, in the second embodiment, the housing includes the projection portion 34 projecting from the display unit 13 towards the main body unit 12, and the securing portion 35 is provided on the projecting portion 34. With this structure, the fixing portion 35 can be provided in the display unit 13. Further, a predetermined thickness dimension can be maintained in advance in the projecting portion 34. Therefore, with the structure that the securing portion 35 is provided at this position, it is possible to prevent the portable computer 51 from becoming thicker as a result of providing the securing portion 35.

The electronic device is applicable not only to the portable computers 11 and 51 discussed in the above-provided embodiments, but also some other electronic devices such as mobile telephones. Moreover, it is only natural that the electronic device can be modified into various versions as long as the essence of the invention does not fall out from its scope.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic device comprising:
    a main body unit;
    a display unit rotatable between a first position where the display unit covers the main body unit and a second position where the display unit stands up with respect to the main body unit, and including a display;
    a display cabinet including a main portion in which the display is retained, and a projecting portion projecting from the main portion to the main body unit;
    a through hole formed in the projecting portion and provided astride the display unit and the main body unit, an anti-theft wire being secured by use of the through hole;
    a hinge mechanism provided astride the main body unit and the projecting portion of the display unit and enabling the display unit to be rotatable between the first position and the second position; and
    a metal fitting having a "U"-shaped cross section, being integral with the hinge mechanism and fitted in the projecting portion in such a manner as to reinforce the through hole.

2. The electronic device of claim 1, wherein the through hole is provided at a section having a maximum thickness dimension.

3. The electronic device of claim 2, wherein the through hole is elongated in a direction parallel to a direction in which the main body unit extends.

* * * * *